*Egon Hoppe
Alex A. Cretescu
INVENTORS.*

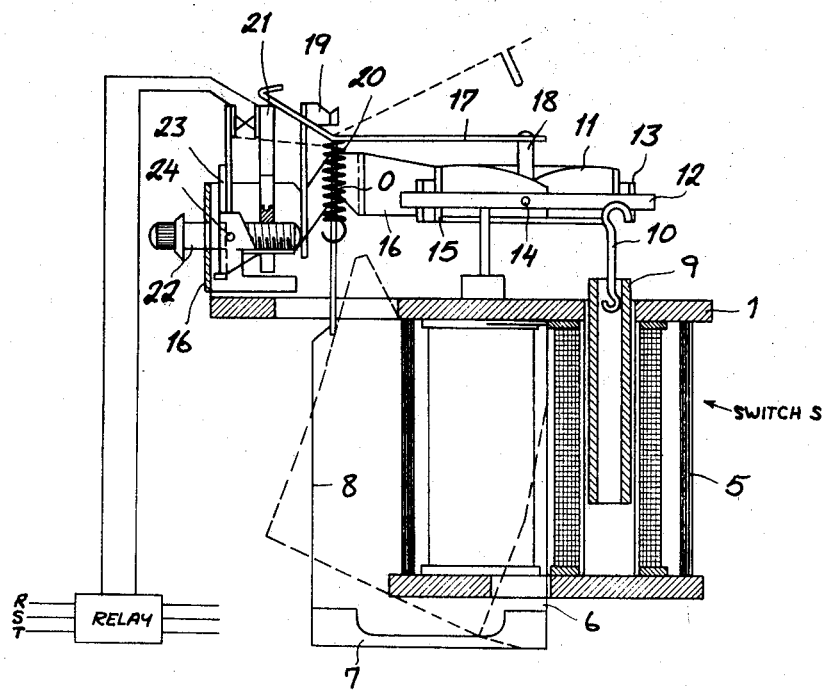
FIG. IA
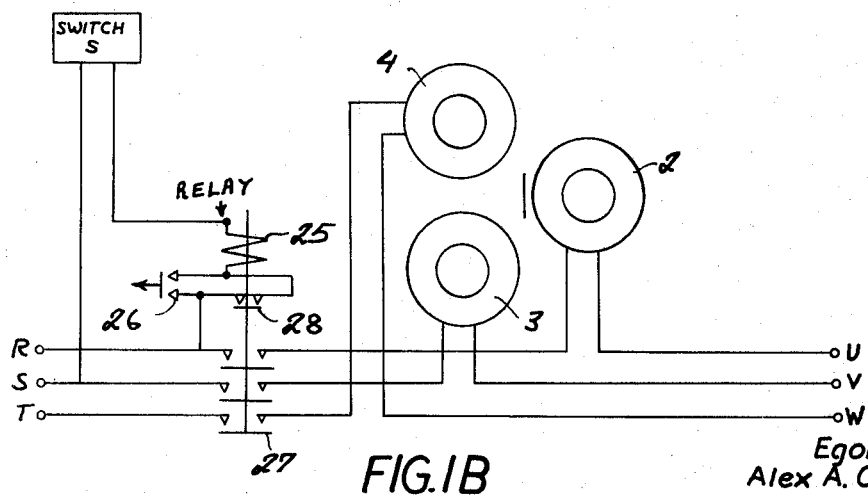
FIG. IB

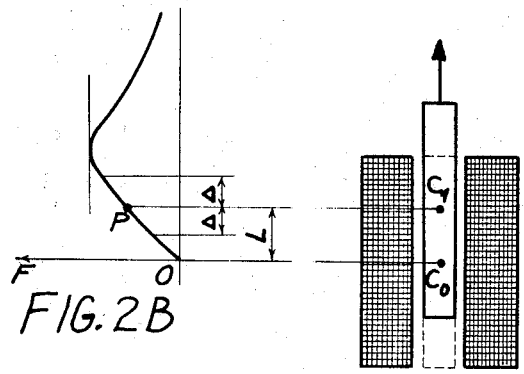
FIG. 2B
FIG. 2A
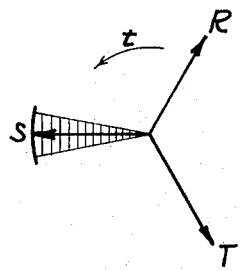
FIG. 3
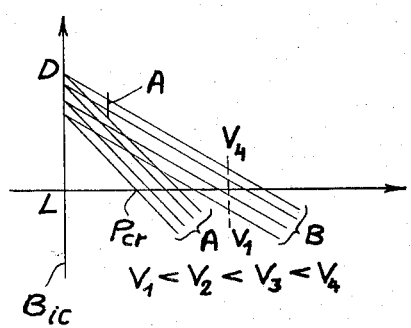
FIG. 4
Egon Hoppe
Alex A. Cretescu
INVENTORS.
BY Karl G. Ross
Attorney

BY

*Karl G. Ross
Attorney*

United States Patent Office 3,505,582
Patented Apr. 7, 1970

3,505,582
PROTECTIVE DEVICE FOR THREE-PHASE INDUCTION-MOTORS
Egon Hoppe and Alex Armand Cretescu, Bucharest, Rumania, assignors to Ministerul Industriei Constructiilor de Masini, Calea Victoriei, Bucharest, Rumania
Filed Mar. 31, 1966, Ser. No. 539,115
Int. Cl. G05b 5/00
U.S. Cl. 318—475           7 Claims

ABSTRACT OF THE DISCLOSURE

A protective device for three-phase induction-motors having three current coils connected in series with the three line-voltage leads, a relay having individual sets of contacts in series with these leads, and the three power-input terminals of the motor windings. The coils each are designed to displace respective cores coupled with an armature body suspended rollingly with at least two degrees of freedom whereby symmetrical current flow through the coils causes a balanced deflection of the body. Imbalance in the current-flow symmetry through the coils leads to deflection of the body and the operation of a spring-loaded contact when the asymmetry reaches a predetermined level to trip the relay. A thermally sensitive element located within the coil and heated thereby is mechanically connected to the main contacts to trip them upon sensing of overheating of the coils.

Our present invention relates to a protective device for three-phase induction motors and, more particularly, to a device of the character described, which provides protection both against the danger of single phasing (failure of two of the supply phases), against the danger of short circuiting between phases, against the danger of grounding of a phase, against three-phase short circuits, and against symmetrical or asymmetrical overloads.

It has previously been proposed to provide protective devices for induction motors which are capable of so-called "combined protection," i.e. an application to protect an induction motor against asymmetrical and symmetrical overloads, single phasing and short circuiting between phases, all phases or to ground. Such devices have heretofore been used in conjunction with thermal relays designed to react to the symmetrical overloads to which the protective devices themselves cannot adequately respond. Consequently, the cost of an automatic starting switch provided with protective devices or circuit breakers of the character described is higher for the combined protection than for starting devices using thermal (bimetallic) strips and the like.

It is a principal object of the present invention to provide an improved protective device for the combined protection of 3-phase induction motors against asymmetrical overloading or short circuiting or even circuiting as well as against symmetrical overloads of the character described, the device being of low cost and relatively simple construction.

We are able to attain this object, and other objects which will become apparent hereinafter, in a protective device for 3-phase induction motors having three current coils connected in series with three line-voltage leads, with respective sets of relay contacts and with the three power-input terminals of the motor windings. The current coils of the protective device are designed to electromagnetically displace respective cores coupled with a common armature body suspended rollingly or nutatingly with at least two degrees of freedom whereby symmetrical current flow through the coils causes a balanced deflection of the body. Imbalance in the current-flow symmetry through the coils leads to a deflection of the armature body and the operation of a spring-loaded contact, as soon as this asymmetry reaches a predetermined level to trip the relay. A thermally sensitive element located within the coil structure is heated thereby and is mechanically connected to the main contacts to trip them upon sensing of overheating of one or more coils representing a symmetrical or an asymmetrical short circuiting or overload of the respective series circuit.

The resulting device thus makes use of a single ambient temperature-compensated thermal strip for overload protection, the strip being heated by temperature rise in a thermally insulated space between the three current coils of the device. The result is a reduction in the energy dissipated in the protective device, a reduction in voltage drop and a lower cost for the unit.

The above and other objects, features and advantages of the present invention will become more readily apparent from the following description, reference being made to the accompanying drawing in which:

FIG. 1A is an elevational cross-sectional view of the switching system according to the present invention, showing the relay of FIG. 1B in block form;

FIG. 1B is a diagram illustrating the layout of the coils and its relationship with the nutating body, while showing the switching members in block form;

FIG. 2A and FIG. 2B is an axial cross-sectional view of the coil and its armature and a graph, respectively, showing the relationship of the current to the displacement of the armature;

FIG. 3 is a vector diagram illustrating the principles of the present invention;

FIG. 4 is a graph of the relationship between the cooperating torques;

Figure 5A:
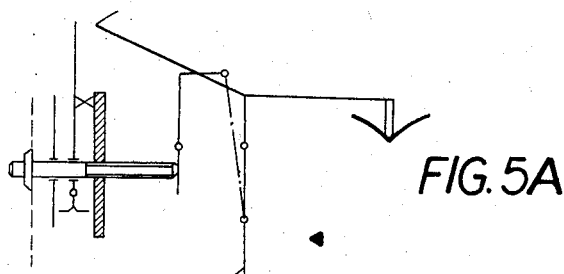
FIGS. 5A through 5D are diagrams illustrating the operating relationships of the levers used in the relay.
Figure 5B:
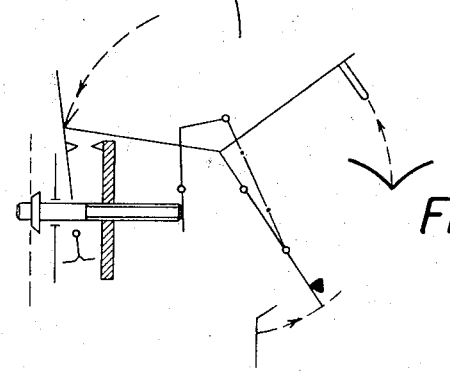
Figure 5C:
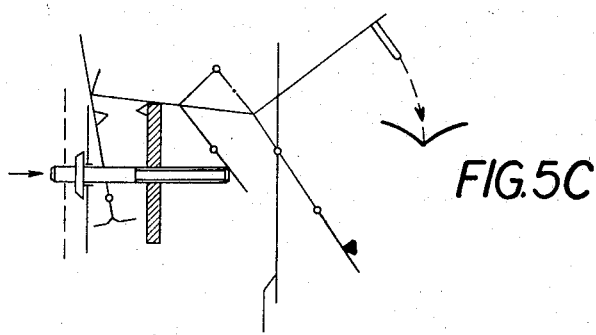

In FIGS. 1A through 1B, we have shown a relay which comprises a base plate 1 upon which the current coils 2, 3 and 4 are suspended in a coil case 5 at the vertices of an equilateral triangle so that a bimetallic strip 6 (responsive to thermal overload) can be received between the coils. The bimetallic strip 6 acts upon a bimetallic compensating strip 8 exposed to ambient temperature and located externally of the insulated housing 5 and connected by means of a connecting bar 7 (FIG 1A). Within each of the current coils 2, 3 and 4 there is provided a respective iron core 9 linked by a tie rod 10 to a funnel-shaped nutating disk 11, which is capable of pivoting around the spindle 12. The spindle 12, in turn, is swingable in an oscillating ring 13 whose pivot axis is defined by a pair of belts 14 fixed in the stationary frame 16 of the device.

A pair of spacing sleeves 15 and the hooks of the tie rods 10 ensure symmetrical positioning of the disk 11 with the coils 9 in corresponding positions. A tripping lever 17 is swingably mounted in the frame 16 by knife-edge suspension and has a pin 18 extending to the base of the funnel-shaped disk 11. A resetting lever 19 is also swingably mounted in the frame 16 in knife-edge suspension, both levers 17 and 19 being held yieldably in place by the single spring 20 (see FIGS. 1A and 5A through 5D). A sliding contact 21 is mounted in the frame 16 and threadedly receives an adjusting screw 22 which bears upon the resetting lever 19 to establish the rest position of the latter and thereby determine the counter-rotating torque produced by the spring 20 in response to a rotation of the lever 17 of the device.

When the sliding contact 21 is urged to the left (FIG. 1A) upon rotation of this groove 22, it engages the contact 23 at two locations, namely at the point of contact and the two prominences or protuberances of the swinging contact 23 which lie in the opposite sides of the oscillation axis constituted by a pair of belts or pins 24 fixed in the frame 16.

The circuit arrangement can also include an operating or holding coil 25 (RELAY) which is in circuit with one of the pairs of lines of the supply network and operates a bank of contact fingers 27 respectively connected in series with the current coils 2, 3 and 4 and the motor terminals U, V, W.

A starting switch 26, which is manually operable, is connected in series with the coil 25 between the lines R–S (FIG. 1B). A holding contact 28 is also provided for operation with the relay 25 through 27. An indicator (not shown) may be fixed to the tripping lever to reveal to the observer the state of the protective device.

A knurled extremity of the adjusting screw 23 is adjusted at the factory and cooperates with an engraved portion of the frame of the mechanism.

Between operations, the spring 20 (FIG. 1A and FIGS. 5A through 5D) centers the funnel-shaped disk 11 with its pin 18. As is represented in FIGS. 2A, and 2B, energization of one of the coils 2 through 4 displaces the corresponding core 9 from the symmetrical position $C_0$ to the position $C_1$. During this movement, the electromagnetic force, initially at zero, increases almost proportionally to the displacement (FIG. 2B) and then at a slower rate, the electromagnetic force reading an upper limit when the center of gravity of the core is located approximately at the upper end of the coil. With further displacement, the force begins to decrease and asymptotically approaches zero. Consequently, the three cores 9 of the coils 2 through 4 may be considered to be linked to the disk 11 with the identical radii $a$ so that their centers of gravity are located approximately at a level $c_1$ as illustrated in the drawing. The forces resulting at the working point (in terms of torques) are at stable equilibrium since $$F_{(2)}a = F_{(3)}\frac{a}{a} + F_{(4)}\frac{a}{2}$$

where $F_{(2)}$, $F_{(3)}$ and $F_{(4)}$ are the forces derived from the respective coil, $a$ is the radius of each applied force and $a/2$ is the effective perpendicular distance of the forces applied by the other two coils. This relationship, for equal forces, can be written as $$F \cdot a = 2F \cdot \frac{a}{2}$$

At any inclination of the disk caused by external force, the electromagnetic force of the elevated core increases while that of the lower core decreases to produce a self-balancing torque resisting the tilt of nutation of the disk and tending to bring the disk into its initial position.

In very asymmetrical conditions, i.e. when $$\xi = (I_s + I_d)/I_s \geq 1.5$$

where $I_s$=symmetrical load current and $I_d$=current caused by a fault, the disk inclines to another equilibrium position, with an angle determined by $$\alpha = \arcsin \frac{L}{a} \cdot \frac{\xi^2 - 1}{\xi^2 + 1}$$

where $L$ is the distance between the center of gravity of the core and the center of the coil at the equilibrium point (FIGS. 2A and 2B), and $a$ is the radius at which the cores are linked to the disk 11.

At the loss of a phase $I_s$=0 and $I_d$=load current, so that the inclination of disk 11 is $$\alpha = \arcsin \frac{L}{a}$$

that is the disk inclines till the cores of the energized coils reach the symmetrical position $C_0$ (FIGS. 2A and 2B).

For short-circuits between phases or short-circuits between any of the three phases and ground (in networks with grounded neutral), the situation is practically identical because $I_s$ is negligible by comparison with $I_d$.

In case of three-phase short-circuits, instantaneous release also takes place by the inclination of the disk since in symmetrical conditions the disk is in dynamic equilibrium. FIG. 3 shows that shortly before and shortly after each of the phase currents passes through its zero point, the device is virtually under the influence of only two phases and begins to incline resulting in a rotative or nutative inclination with twice the frequency of the supply system. Because of the inertia of the disk J, for a given frequency $f$ of the system and for certain electromagnetic construction data (ampere-turns, thickness of the cores, etc. included in constant $p$), the adjustable inclination $\alpha$ required for releasing determines the three-phase short-circuit current in symmetrical conditions at which release occurs (practically instantaneously), according to the formula:

$$I_{\text{three-ph}} = k \cdot f^2 \cdot \frac{J}{p} \cdot \alpha$$

Construction data may be chosen so that release takes place $I_{\text{three-phase}} \approx 10 I_n$, when $f$=50 c./s.

In case of symmetrical (technological) overloads and rheostatical short-circuits (leakages), release is effected through the single bi-metallic actuators.

The release lever 17 remains motionless till the instant of release. In accordance with the adjustment, the distance between the axis of the spring and the oscillation point O (FIG. 1) determines the antagonistic (countervailing) torque at the working point L (FIG. 4), the fascicle of straight lines A corresponding to the various adjustments. When the release lever is moved, the antagonistic torque decreases till the critical point $P_{cr}$ (where it is zero) and becomes an active torque beyond $P_{cr}$.

In accordance with the load current $I_s{}^2$ the temperature of the bi-metallic strip $\alpha$ determines the active torque at the working point, the fascicle of straight lines B corresponding to the various temperatures. As the release lever is moved, the bi-metallic torque decreases till it reaches the position in which the extremity of the bi-metallic strip would be displaced in air. When the motor is running and the temperature of the bi-metallic strip inside the coil case increases, the release lever remains motionless while the thermal strips (active and compensating) bend because of their mehcanical elasticity. The release movement of the release lever begins only when the bi-metallic torque equals the antagonistic torque regulated (in D). As soon as the release movement begins, it continues with the acceleration produced by the increasing difference ($\Delta$) between the active and antagonistic torques. Both of these torques decrease but not in the same relation because of the differing inclinations of the characteristics A and B.

For symmetrical situations, when the starting button 26 is pressed, the operating or holding coil 25 is energized and the contact 27 connects the motor terminal U, V, W to the respective line terminals R, S, T while the contact 28 holds the relay in its "on" condition, the self-balancing of the magnetic system avoiding release at this time. In all asymmetrical situations, the disk 11 inclines in the direction of asymmetry and lifts the pin 18 to trip the lever 17. Release of the relay is identical in the case of three-phase short circuits in which $I \geq I_n$.

In the case of sustained technological overloads in excess of 20%, the increased temperature in the thermally insulated space between the coils 2, 3, 4 causes the bi-metallic strip 6 to bend, thereby producing a time-delayed tripping of the relay, as described in connection with FIG. 4, and shifts the bi-metallic system into the position represented by broken lines in FIG. 1a.

Upon tripping by any of the foregoing conditions, the released lever 17, via its contracting and opening arm, rotates the contact 23 above the pins 24 in the counterclockwise sense (FIG. 1a) while the prominences of contact 23 push contact member 21 to the right. In this situation, the single spring 20 is contracted. In the event of insulation breakdown producing rheostatical short circuits while the motor is running, release is effected when the sum of the quantities of heat generated by the three coils equals the quantity of heat corresponding to a symmetrical overload of 20%. When a rheostatical short circuit occurs between one phase and ground at a load current $I_s = 0.9\ I_n$, the current cannot exceed $1.42\ I_n$ since then the degree of asymmetry would exceed 1.5 and trigger release instantaneously.

Disconnection of the system can be effected by pressing the adjusting screw 22 which also serves for resetting of the device.

Preferably, the release is carried out indirectly by means of a button fixed on the front core of the unit so that involuntary rotation of the adjusting screw is impossible. By pressing the screw, the operator shifts contact 21 to the right, thereby breaking the circuit until the button is disengaged. The resetting lever 19 swings counterclockwise while the spring 20 is stretched until its axis swings past the critical point of the bistable lever 17 and the pin 18 centers the disk 11 by the force of this spring.

In FIGS. 5A through 5D, we have shown successive operating steps of the device.

Figure 5D:
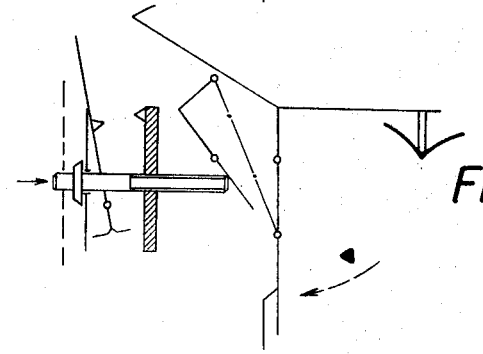

In FIG. 5A, the protective device is shown with its contact closed after a period of running under overload, the compensating strip 7 being bent. Upon thermal tripping, the mechanism attains the position represented in FIG. 5B. During resetting (FIG. 5C) in the final point before the lever snaps back into its original position, the spring 20 is stretched to its maximum. In FIG. 5D, the disk 11 is centered by the pin 18. Upon hand-resetting of the device, the position of the mechanism is that illustrated in FIG. 5D. The screw 22 enables adjustment of the sensitivity of the device, thereby rendering inoperative the bi-metallic system when thermal tripping is undesirable and enabling instantaneous release only when the motor is connected to the line system when one line is interrupted, but not when the motor is running.

What is claimed:

1. A protective system for a three-phase induction motor having three current-input terminals connected to the windings thereof, said system comprising electromagnetically operable breaker means connected between three line-current terminals and said motor and electrically tripped to disconnect said motor from the line-current terminals; and overload-sensing means provided with a main contact connected with said breaker means upon operation of said main contact, said overload-sensing means including three electromagnetic coils each connected in series between one of said line-current terminals and a respective motor-winding terminal and adapted to develop an electromagnetic field of an intensity substantially proportional to the amplitude of the current traversing the coil, an armature body suspended with at least two degrees of freedom and operated by the electromagnetic fields of said coils for substantially symmetrical undulating displacement at a frequency relating to the frequency of the electrical current traversing said coils, and coupling means including a spring-loaded arm operatively connecting said body and said main contact for operating said main contact to trip said breaker means upon asymmetric displacement of said body by said coils in response to nonuniform current flow therethrough.

2. The system defined in claim 1, further comprising a temperature-responsive element nested with said coils and mechanically linked with said coupling means for operating said main contact upon generation of excess heat by said coils indicative of an overload of said motor.

3. The system defined in claim 2 wherein said control means includes a bistable lever, spring means for retaining said lever in a first position wherein said main contact is unoperated, and a second position wherein said contact is operated, said lever jumping under the action of said spring means from said first position to said second position, said body being formed as a disk, said coils having respective cores coupled with said disks for rollingly displacing same, said disk having an axis parallel to the axis of said coils, said lever being formed with a pin axially engaging said disk and displaceable thereby in asymmetrically energized condition of said coils to displace said lever and permit it to jump from said first position to said second position.

4. The system defined in claim 3 wherein said lever has an arm operatively connected with said element for displacement of said lever in a thermally overloaded condition of the motor from said first position to said second position.

5. The system defined in claim 4, further comprising a manually displaceable member operatively engaging said lever for shifting same from said second position to said first position.

6. The system defined in claim 5 wherein said main contact is connected in series with said breaker means and said breaker means has a normally energized condition closing a circuit between said line-current and motor terminals.

7. The system defined in claim 4 wherein said coils are located at the vertices of an equilateral triangle and said pin is disposed substantially at the geometric center of said triangle, said element being also disposed substantially at said geometric center.

References Cited

UNITED STATES PATENTS

| | | | |
|---|---|---|---|
| 2,806,183 | 9/1957 | Gimson et al. | 317—27 |
| 3,121,826 | 2/1964 | Kniel et al. | 317—27 |
| 3,305,715 | 2/1967 | Stenger | 318—221 |

ORIS L. RADER, Primary Examiner

G. Z. RUBINSON, Assistant Examiner

U.S. Cl. X.R.

317—27, 47, 58; 318—221